United States Patent
Arita

(10) Patent No.: US 8,170,798 B2
(45) Date of Patent: May 1, 2012

(54) NAVIGATION SYSTEM AND OPERATION GUIDANCE DISPLAY METHOD FOR USE IN THIS NAVIGATION SYSTEM

(75) Inventor: Hidekazu Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 597 days.

(21) Appl. No.: 12/438,337

(22) PCT Filed: May 29, 2007

(86) PCT No.: PCT/JP2007/060924
§ 371 (c)(1), (2), (4) Date: Feb. 20, 2009

(87) PCT Pub. No.: WO2008/035489
PCT Pub. Date: Mar. 27, 2006

(65) Prior Publication Data
US 2010/0004850 A1    Jan. 7, 2010

(30) Foreign Application Priority Data
Sep. 22, 2006  (JP) ................................ 2006-257414

(51) Int. Cl.
*G06F 7/00* (2006.01)

(52) U.S. Cl. ...................................... 701/538

(58) Field of Classification Search .................. 701/200, 701/400, 538
See application file for complete search history.

(56) References Cited

U.S. PATENT DOCUMENTS

| 5,978,595 A | 11/1999 | Tanaka et al. |
| 6,298,304 B1 * | 10/2001 | Theimer ....................... 701/210 |
| 6,587,039 B1 * | 7/2003 | Woestemeyer et al. .... 340/425.5 |

FOREIGN PATENT DOCUMENTS

| DE | 19955890 A1 | 6/2001 |
| JP | 2001-147797 A | 5/2001 |
| JP | 2001-216129 A | 8/2001 |
| JP | 2002-199081 A | 7/2002 |
| JP | 2004-156995 A | 6/2004 |
| JP | 2005-352877 A | 12/2005 |
| JP | 2006-11575 A | 1/2006 |

* cited by examiner

*Primary Examiner* — Amee A Shah

(74) *Attorney, Agent, or Firm* — Birch, Stewart, Kolasch & Birch, LLP.

(57) ABSTRACT

A navigation system according to the present invention includes a control device 1 equipped with an automatic operation management means 10 for, when acquiring an operation guidance display request which is generated by a user's manipulation of an input device 2, making a direct transition to a final operation screen which is required to judge the user's intention among operation screens which are developed to implement navigation, and for combining the above-mentioned final operation screen which is reduced and a corresponding operation guidance to display them on a display device 5.

3 Claims, 10 Drawing Sheets (a) Setting Screen in Normal Mode (b) Setting Screen in Operation Explanation Mode

NAVIGATION SYSTEM AND OPERATION GUIDANCE DISPLAY METHOD FOR USE IN THIS NAVIGATION SYSTEM

FIELD OF THE INVENTION

The present invention particularly relates to a navigation system suitable for use in vehicle-mounted equipment, and an operation guidance display method for use in this navigation system.

BACKGROUND OF THE INVENTION

When a user purchases electronic equipment and starts using this electronic equipment, he or she refers to an instruction manual (an operation manual) bound in the form of a paper booklet and attached to the electronic equipment in order to check a method of operating the electronic equipment.

As an alternative, the instruction manual can be electronized into a PDF (Personal Document File) or the like in advance and can be included in the electronic equipment, so that the user can read the PDF as needed and can also check the operation method by displaying the PDF on a display monitor.

On the other hand, a technology for use in vehicle-mounted equipment, such as a navigation system, of downloading descriptions about a tire replacement method, a method of handling oil leakage, and so on to a recording medium which the vehicle-mounted equipment has, such as an HDD (Hard Disk Drive) or a memory card, and then displaying them on a display monitor which the vehicle-mounted equipment has is known. In this case, the descriptions are contents for exclusive use including voices and moving images, which are different from the paper booklet (for example, refer to patent reference 1).

Furthermore, there has been provided electronic equipment equipped with an operation simulation mode in which the electronic equipment explains an operation method in such a way as to enable the user to perform an operation which the user intends while the user is allowed to perform each operation of the simulation (for example, refer to patent reference 2).
[Patent reference 1] JP, 2004-156995, A
[Patent reference 2] JP, 2006-11575, A However, simply enabling the user to browse an existing instruction manual, like in the conventional example, cannot eliminate the difficulty of handling an application, such as a navigation application, while checking the instruction manual of the application. More specifically, unlike in the case of a PC (Personal Computer) having a relatively large display area, in the case of vehicle-mounted equipment, such as a navigation system, having only a small- or middle-sized display area, because a multi-window display of both an operation screen and an operation manual screen (referred to as operation guidance from here on) is not appropriate, the display resources are shared by them and the operation screen and the operation manual screen are shown with screen separation. For this reason, a complicated font, such as a kanji font, is hard to read, and it is actually impossible for the user to read the description about the operation manual and to simultaneously perform an operation shown in the actual operation screen.

In contrast, in the case of providing an explanation about a method of operating equipment other than navigation, the technology disclosed by patent reference 1 is effective because no display resource conflict occurs, whereas in the case of showing a method of operating navigation on a display monitor which this navigation system has, a display resource conflict occurs, as mentioned above.

Furthermore, according to the technology disclosed by patent reference 2, the user has to perform all the operations through the simulation. Therefore, the conventional technology is inefficient. More specifically, in a case in which a menu screen is developed in the following way: "generally-displayed screen (map display)→operation 1→large classification menu→operation 2→small classification menu→operation 3→operation screen for selection which the user intends." The user has to perform the "operation 1", the "operation 2", and the "operation 3" until he or she reaches the operation screen (the operation screen for selection which the user intends) which is required in order to implement the user's intention, and therefore the number of operations (the number of clicks) that the user performs increases, the technology is user-unfriendly, and the load on the user is large.

The present invention is made in order to solve the above-mentioned problems, and, considering the fact that increase in the resolution of display monitors (for example, use of VGA: Video Graphics Array-ready display monitors), as well as improvements in display monitors and OSs (Operating Systems), has enabled sharp drawing of an image including a font, it is an object of the present invention to provide a navigation system which can avoid display resource conflicts by producing a reduced display of an operation screen and which can produce an improvement in the visibility of the operation screen, and an operation guidance display method for use in the navigation system.

It is another object of the present invention to provide a navigation system which produces an improvement in the user-friendliness thereof by omitting manual operations (e.g., operation 1 and operation 2) which the user has to perform in order to reach a final operation screen for implementing the user's intention so as to reduce the load on the user, and an operation guidance display method for use in the navigation system.

DISCLOSURE OF THE INVENTION

A navigation system in accordance with the present invention is comprised of a control device equipped with an automatic operation management means for, when acquiring an operation guidance display request which is generated by a user's manipulation of an input device, making a direct transition to a final operation screen which is required to judge the user's intention among operation screens which are developed to implement navigation, and for combining the above-mentioned final operation screen which is reduced and a corresponding operation guidance to display them on a display device.

An operation guidance display method for use in the navigation system in accordance with the present invention includes the steps of: a control device which constructs the navigation system being triggered by acquisition of a request for display of an operation guidance which is generated by a user's manipulation of an input device to refer to a storage device in which a series of operation screens leading to display of a final operation screen required to judge the user's intention of the manipulation done by the user are stored in a form of graph structure, and to extract transition paths respectively leading to nodes which construct the above-mentioned graph; carrying out development and control of operation guidances being held while being respectively associated with the nodes which construct the graph in turn according to operation screen transition sequences; and generating display information which is a combination of each of the operation guidances and a reduced operation screen corresponding to each of the operation guidances and sequentially updating the display information at a speed which the user can recognize to display the display information on the display device, or combining the reduced final operation screen and an operation guidance corresponding to the final operation screen to display them on the display device.

In accordance with the present invention, operation screens are reduced, display resource conflicts are avoided by producing a display of a composite screen of an operation screen and an operation guidance and an improvement is provided in the visibility of the display screen, and an improvement is provided in the user-friendliness of the navigation system by omitting manual operations required for the user to reach a final operation screen, thereby making it possible to reduce the load on the user.

PREFERRED EMBODIMENTS OF THE INVENTION

Hereafter, in order to explain this invention in greater detail, the preferred embodiments of the present invention will be described with reference to the accompanying drawings. Embodiment 1.

Figure 1:
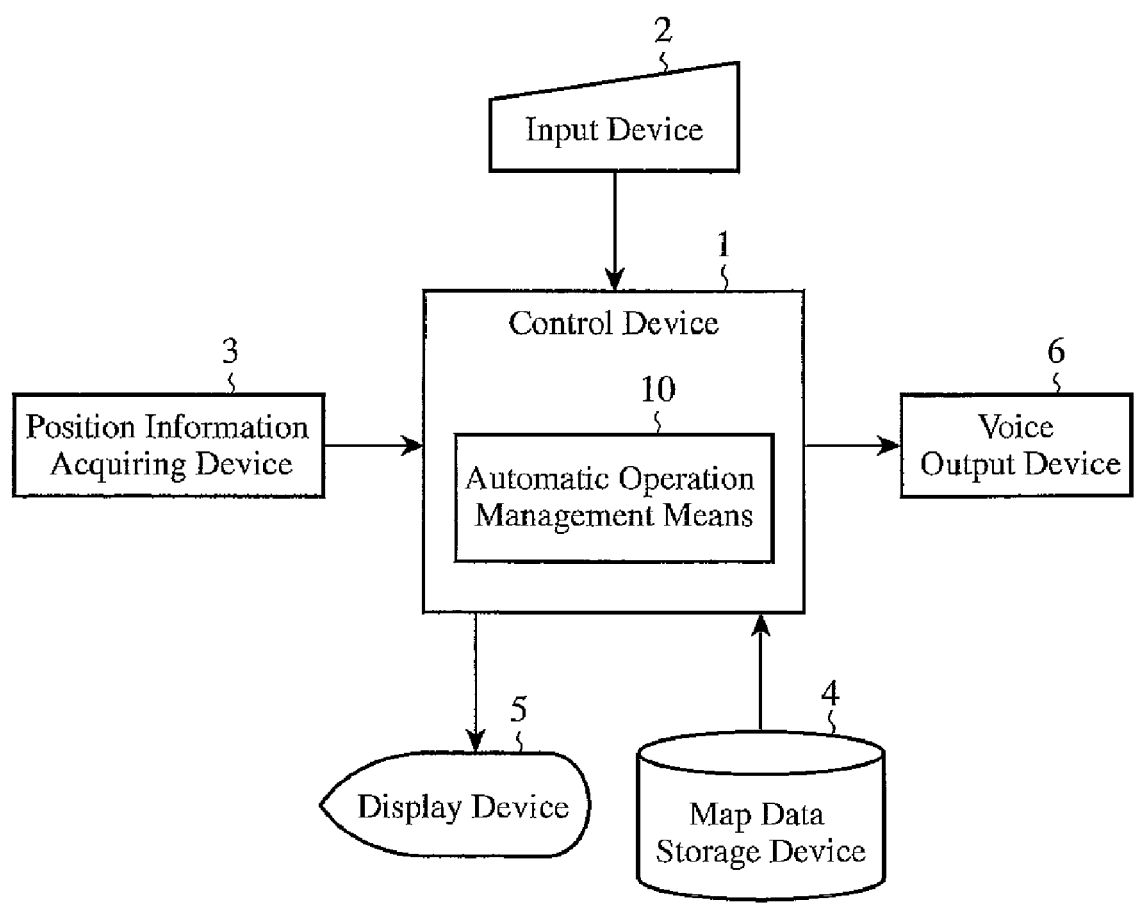
FIG. 1 is a block diagram showing the internal structure of a navigation system in accordance with Embodiment 1 of the present invention.

FIG. 1 is a block diagram showing the internal structure of a navigation system in accordance with Embodiment 1 of the present invention.

The navigation system in accordance with Embodiment 1 of the present invention is comprised of a control device 1 which serves as the control center of navigation, an input device 2, a position information acquiring device 3, a map data storage device 4, a display device 5, and a voice output device 6.

The input device 2 is a remote control or a touch panel which is manipulated by a user, or an input means for acquiring either an instruction provided by the user or data with voice recognition or the like, and the instruction and the data which are acquired by the input device are captured by the control device 1.

The position information acquiring device 3 includes GPS (Global Positioning System) equipment, a gyroscope, and sensors for measuring a vehicle speed pulse and so on, which are mounted in a vehicle, and the control device 1 can estimate the current position of the vehicle from signals outputted from these sensors. Map data required for the navigation are stored in the map data storage device 4. In this case, the map data storage device does not have to have all of the map data, and can alternatively acquire some map data by downloading them from a server which is externally connected thereto.

The display device 5 consists of an LCD (Liquid Crystal Display Device: liquid crystal) or the like, and displays an operation screen, an operation guidance, and so on which are generated by the control device 1. The voice output device 6 outputs a leading guiding voice and so on under the control of the control device 3.

The control device 1 carries out various functions for the navigation and generates display screen information, and is characterized in including an automatic operation management means 10. As will be mentioned below, the automatic operation management means 10 is a program execution means having a function for, when the user manipulates the input device 2 so as to make a request for display of an operation guidance, extracting a series of operation screen transition sequences leading to display of a final operation screen required to judge the user's intention, developing in turn operation guidances respectively corresponding to operation screens which construct the operation screen transition sequences according to the operation screen transition sequences, combining final operation screen information which the automatic operation management means acquires by reducing the final operation screen, and operation guidance information corresponding to the final operation screen, and displaying the composite screen information on the display device 5.

In this specification, an "operation screen" means, for example, a human interface, such as a navigation screen in which a menu (icons) which urges the user's input is superimposed and displayed on a map.

Figure 2:
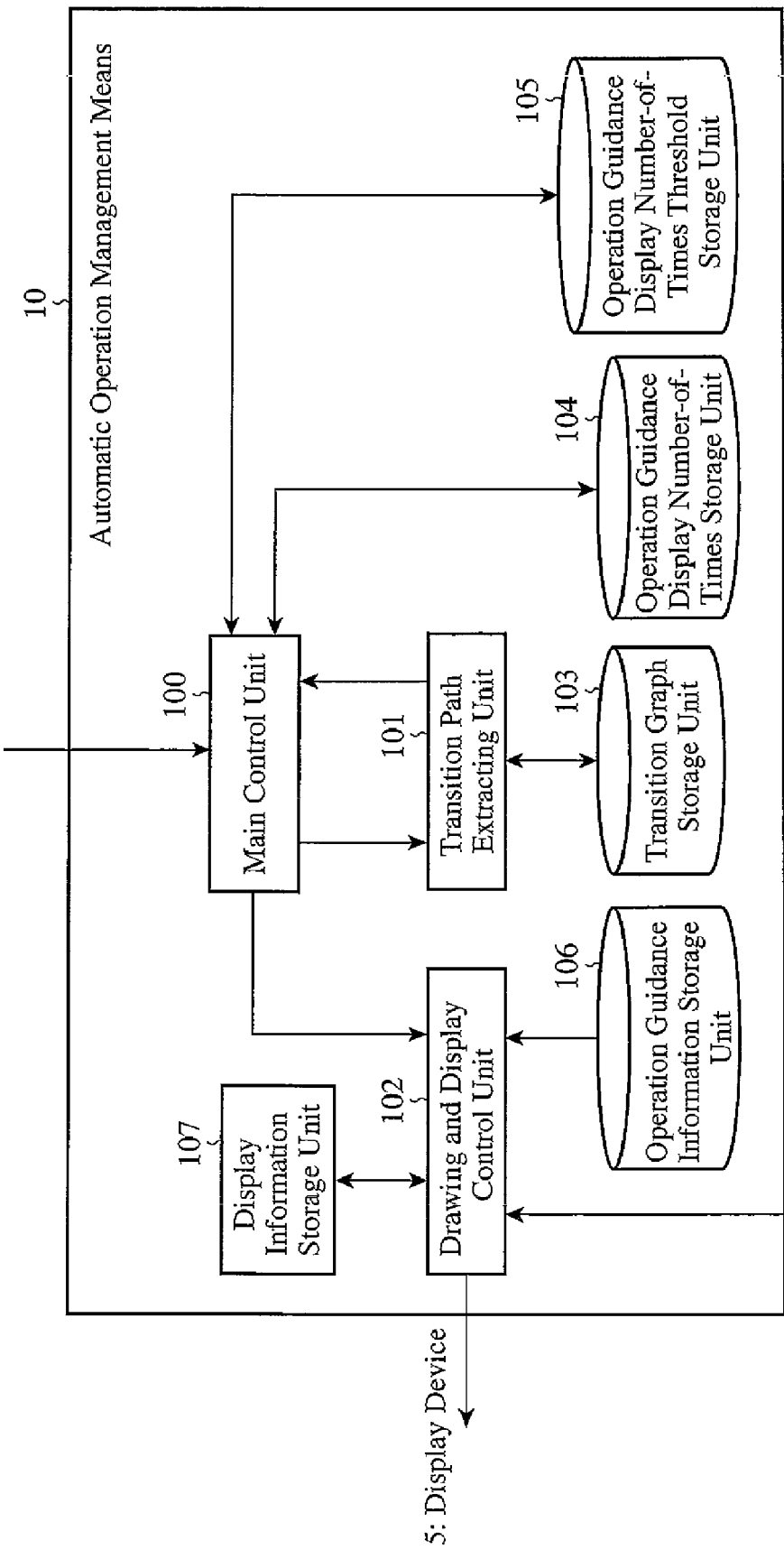
FIG. 2 is a block diagram showing the internal structure of an automatic operation management means shown in FIG. 1, the functions of the automatic operation management means being developed in the figure.

FIG. 2 is a block diagram showing the internal structure of the automatic operation management means 10 shown in FIG. 1, the functions of the automatic operation management means being developed in the figure.

Dividing the structure of the automatic operation management means 10 into components in view of its functions, the automatic operation management means 10 is comprised of a main control unit 100, a transition path extracting unit 101, a drawing and display control unit 102, a transition graph storage unit 103, an operation guidance display number-of-times storage unit 104, an operation guidance display number-of-times threshold storage unit 105, an operation guidance information storage unit 106, and a display information storage unit 107.

The transition path extracting unit 101, in response to the request for display of an operation guidance which the user has made by manipulating the input device 2, refers to the transition graph storage unit 103 which will be mentioned below, and extracts a transition path to each of the operation screens which construct the operation screen transition sequences and delivers the transition path to the main control unit 100. The series of operation screen transition sequences leading to display of the final operation screen required in order to judge the user's intention of his or her manipulation are stored in the transition graph storage unit 103 in the form of graph structure.

The drawing and display control unit 102 has a function of combining each of the operation guidances and a reduced operation screen corresponding to each of the operation guidances under the control of the main control unit 100, and drawing them in the display information storage unit 107. The drawing and display control unit 102 also has a function of reading pieces of display information drawn in the display information storage unit 107, updating them in turn at a speed which the user can recognize, and then displaying them on the display device, or displaying a reduced final operation screen and an operation guidance corresponding to this final operation screen on the display device 5.

The main control unit 100 serves as the control center of the automatic operation management means 10, and has a function of starting the transition path extracting unit 101 according to the operation guidance display request which the input device 2 generates when the user manipulates the input device 2, and carrying out sequential development and control of the operation guidances being held with the operation guidances being associated with respective nodes which construct the graph of the transition graph storage unit according to the operation screen transition sequences.

Furthermore, every time when an initial value is set up for each of the transition paths and an operation screen associated with each of the transition paths is displayed, the main control unit 100 counts the number of times that a corresponding operation guidance is displayed, compares the number of times that the operation guidance is displayed with a certain number of operation guidance display times which is set as a threshold so as to judge whether or not the operation guidance has been displayed, and controls the drawing and display control unit 102.

Every time when the number of display times which is counted for each of the transition paths is updated, the number of display times is stored in the operation guidance display number-of-times storage unit 104, and the threshold of the number of display times which is used for the judgment of whether or not the operation guidance has been displayed is set up and stored in advance in the operation guidance display number-of-times threshold storage unit 105. In addition, the operation guidance information is stored in the operation guidance information storage unit 106, and data about composite display of operating screen information generated and operation guidance information corresponding to the operating screen information selected by the main control unit 100 are drawn into the display information storage unit 107 by the drawing and display control unit 102.

FIGS. 3 to 6 are views which are referred to in order to explain the operation of the navigation system in accordance with Embodiment 1 of the present invention shown in FIGS. 1 and 2.

Hereafter, the operation of the navigation system in accordance with Embodiment 1 of the present invention shown in FIGS. 1 and 2 will be explained in detail with reference to FIGS. 3 to 6.

Figure 3:
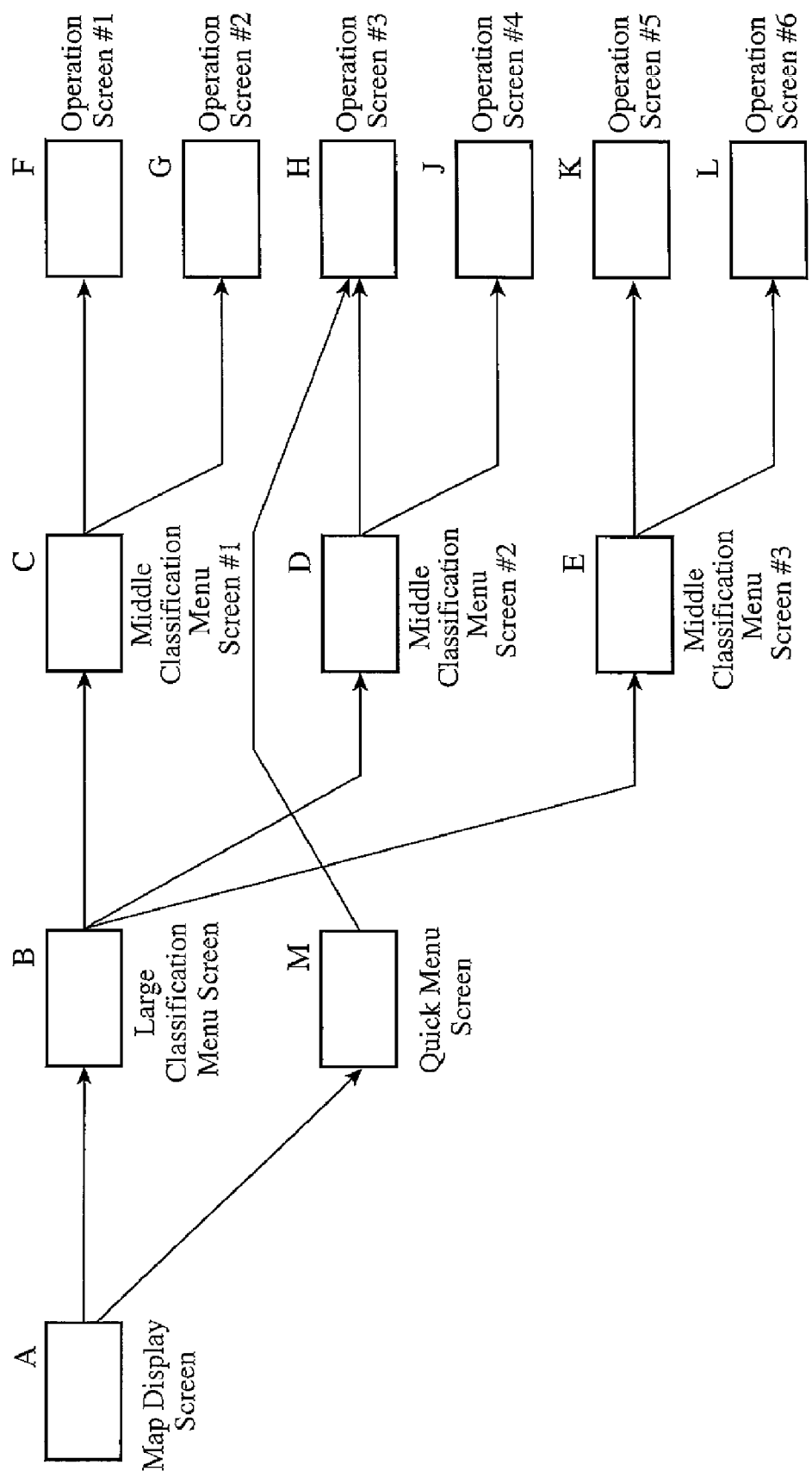
FIG. 3 is a view which is referred to in order to explain the operation of the navigation system in accordance with Embodiment 1 of the present invention, and shows a state transition among operation screens.
Figure 4:
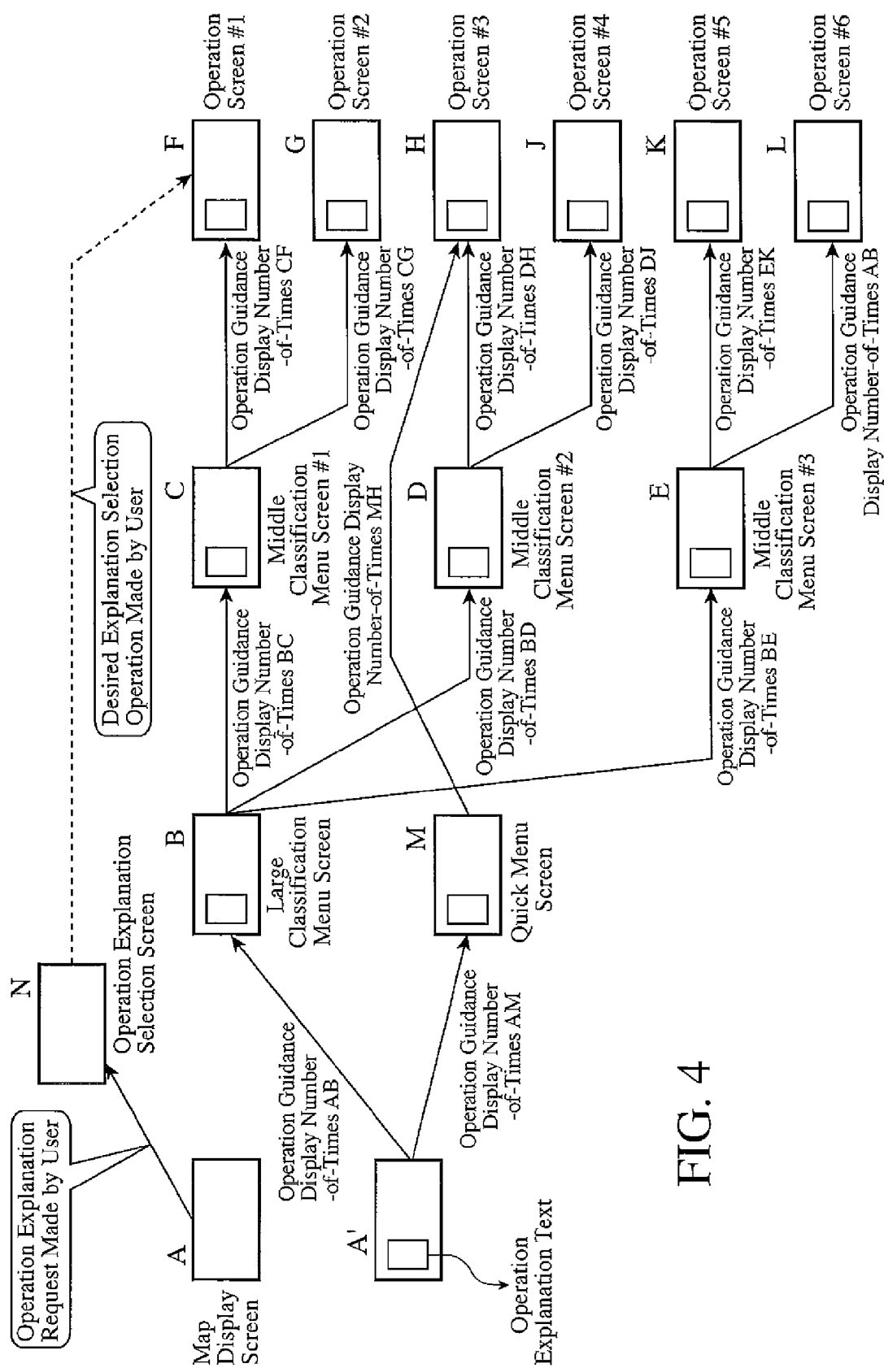
FIG. 4 is a view which is referred to in order to explain the operation of the navigation system in accordance with Embodiment 1 of the present invention, and shows a state transition among operation screens.

FIGS. 3 and 4 are views showing state transitions among operation screens, which are referred to in order to explain an operation guidance display method for use in the navigation system in accordance with Embodiment 1 of the present invention.

In FIG. 3, A shows a display state of a map screen frequently used in the navigation system, in which, for example, the vehicle position is shown on a map. Furthermore, B shows a display state of a large classification menu screen to which the navigation system makes a transition from the display state shown by A (i.e., the map display screen) when instructed to display a general menu by the user. In addition, each of C, D, and E shows a display state of a middle classification menu screen to which the navigation system makes a transition from the display state shown by B (i.e., the large classification menu screen) when instructed to display a general menu by the user. In this example, the case of C (middle classification menu screen #1) is associated with F (operation screen #1) and G (operation screen #2), the case of D (middle classification menu screen #2) is associated with H (operation screen #3) and J (operation screen #4), and the case of E (middle classification menu screen #3) is associated with K (operation screen #5) and L (operation screen #6), and in either case they are developed, respectively, in order for the navigation system to judge the user's intention of his or her manipulation.

Furthermore, M shows a display state of a quick menu screen to which the navigation system makes a transition from the display state shown by A (i.e., the map display screen) when instructed to display a simple menu by the user.

The quick menu screen is associated with H (operation screen #3), and is developed in order for the navigation system to judge the user's intention of his or her manipulation. The navigation system carries out state transitions as mentioned above until the navigation system makes a transition to an operation screen through which the user inputs the user's intention. The listing of states to which the navigation system can make a transition from each state constructs the graph in this way, and it is assumed that the graph is stored in the transition graph storage unit 103.

On the other hand, in FIG. 4, A' shows a display state of a composite screen in which a map screen frequently used in the navigation system, in which the vehicle position is shown on a map, and an operation guidance are combined with each other. Furthermore, B shows a display state to which the navigation system makes a transition from the display state shown by A (i.e., the map display screen) when instructed to display a general menu by the user. On the other hand, M shows a display state (a quick menu screen) to which the navigation system makes a transition from the display state shown by A (i.e., the map display screen) when instructed to display a simple menu by the user.

When the user presses down, for example, an "operation guidance display key" assigned to the input device 2 in the display state shown by A (i.e., the map display screen), or when an operation guidance display request is generated according to a voice command, the navigation system makes a transition to a display state N (i.e., an operation explanation selection screen), and, when the user selects an operation explanation which the user desires on the basis of the operation explanation selection screen, bypasses the display states B, C, D, and E to make a transition directly to a display state F (operation screen #1), and displays an operation screen (operation screen #1) associated with the display state.

In this example, a counter which is shown by an "operation guidance display number-of-times AB" and which is allocated to a program is associated with a link (referred to as a transition path from here on) via which the navigation system makes a transition from the display state A to the display state B. This counter holds the number of times that the navigation system has provided an explanation of the operation of causing the navigation system to make a transition from the display state A to the display state B for the user, i.e., the number of times that the navigation system has displayed the operation guidance. Similarly, a counter shown by an "operation guidance display number-of-times BC" is associated with a transition path extending from the display state B to the display state C.

Furthermore, at each node which constructs the above-mentioned graph, an operation guidance which corresponds to the display state at each node and which is mainly comprised of text information is held while the operation guidance is associated with each node. When producing a display of this operation guidance, the drawing and display control unit 102 acquires the corresponding operation guidance with reference to the transition graph storage unit 103 under the control of the main control unit 100, and combines the operation guidance and the reduced operation screen corresponding to the operation guidance to output and display the composite screen on the display device 5.

Figure 5:
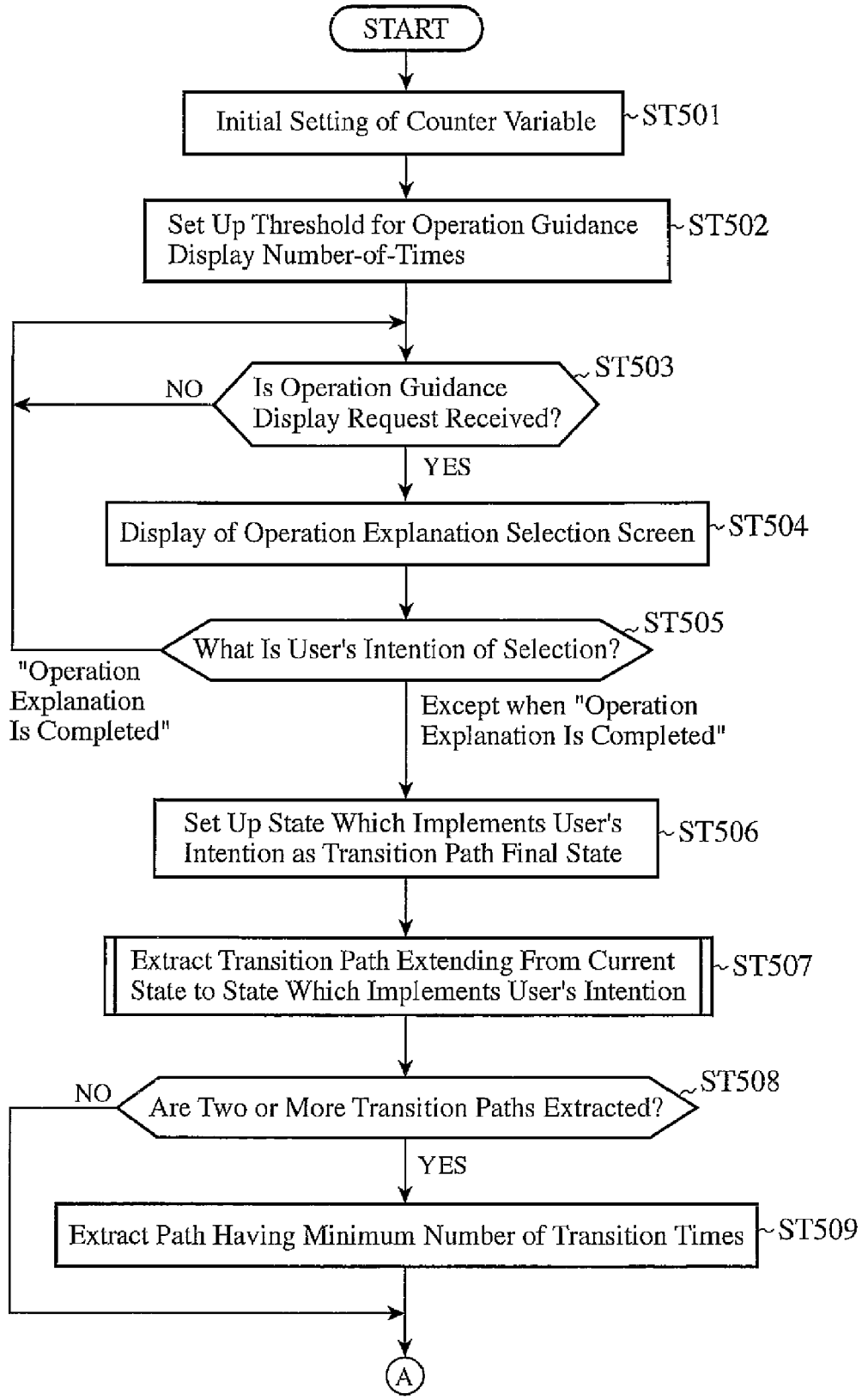
FIG. 5 is a flow chart which is referred to in order to explain the operation of the navigation system in accordance with Embodiment 1 of the present invention.
Figure 6:
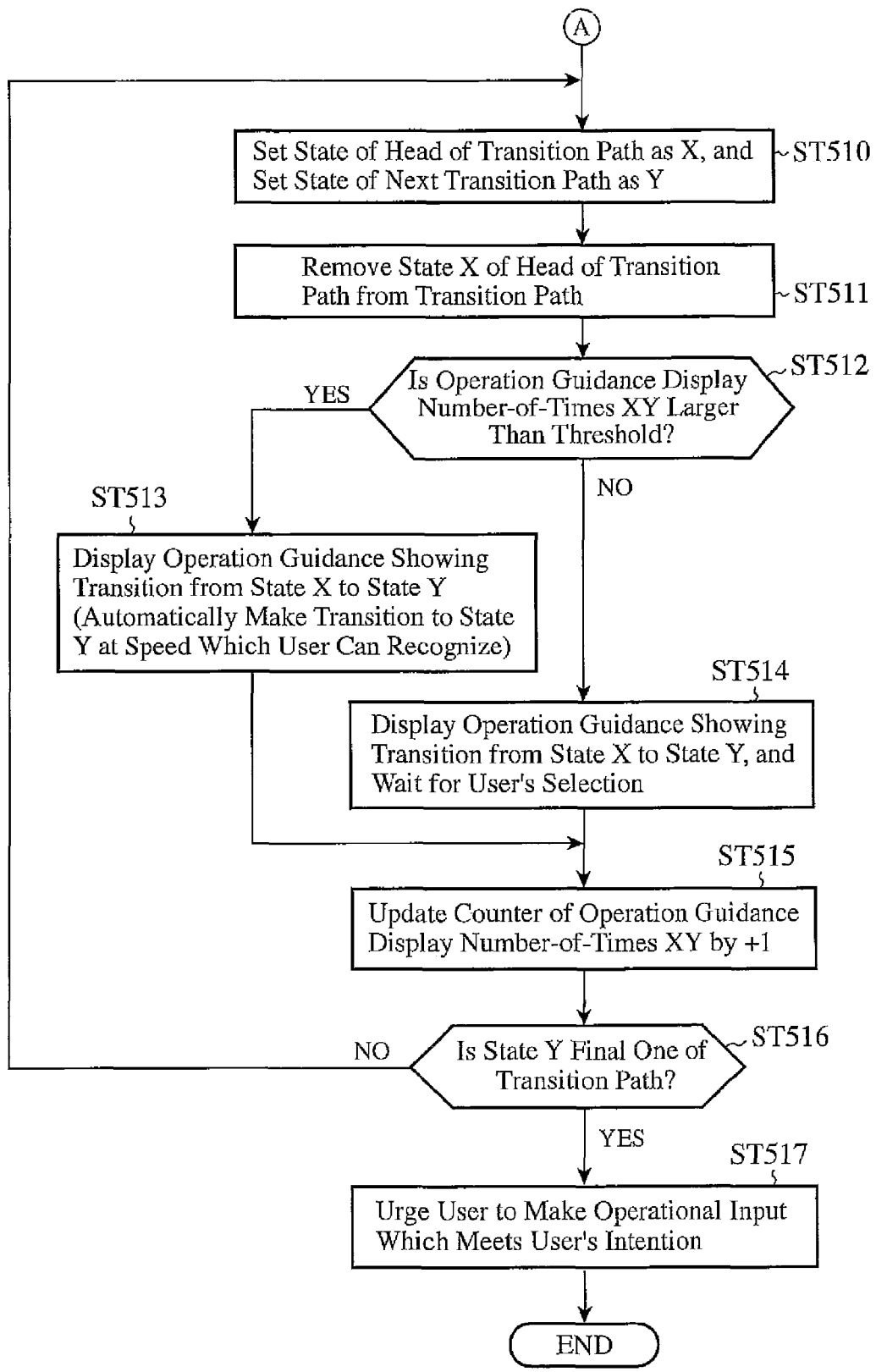
FIG. 6 is a flow chart which is referred to in order to explain the operation of the navigation system in accordance with Embodiment 1 of the present invention.

FIGS. 5 and 6 are flow charts which are referred to in order to explain the operation of the navigation system in accordance with Embodiment 1 of the present invention.

Hereafter, the operation of the navigation system in accordance with Embodiment 1 of the present invention shown in FIGS. 1 and 2 will be explained in detail with reference to the flow charts shown in FIGS. 5 and 6.

The main control unit 100 initializes a counter variable showing an "operation guidance display number-of-times XY" for a transition path extending from each of all display states X to a display state Y first (step ST501 of FIG. 5). The main control unit 100 then reads either a value which was set up by the user by manipulating the input device 2 when using the navigation for the first time, or a value which the system sets up by default to set the value as a threshold for the operation guidance display number-of-times (step ST502).

In a case in which the threshold is set to be, for example, "1", when the navigation system makes a transition from a display state X to a display state Y, the navigation system provides an explanation of an operating method, i.e., produces a display of a so-called operation guidance only once. In contrast, by setting this threshold to be a sufficiently large value, even if the operation guidance has been displayed once, every time when the navigation system passes through a transition path, the navigation system repeatedly produces a display of an operation guidance (provides an explanation of an operating method).

Next, the main control unit 100 judges whether the user has made a request for explanation of an operating method (step ST503). The main control unit judges whether the user has made a request for explanation of an operating method by judging the presence or absence of an operation guidance display request which is generated by either depression of an "operation guidance key" (which is implemented by a hard-key or a softkey) assigned to the input device 2 or recognition of a voice command. When no operation guidance display request has been made, the navigation system waits for the user's depression of the "operation guidance key" or the voice command from the user.

When the user makes a request for explanation of an operating method, the main control unit 100 controls the drawing and display control unit 102 to display an operation explanation selection screen N as shown in FIG. 4 (step ST504). Next, when the user who has recognized the operation explanation selection screen N visually manipulates in order to select an explanation of an operating method which the user desires, the main control unit 100 judges the user's intention of his or her manipulation (step ST505). In this case, when the operation explanation based on the user's intention of his or her manipulation is completed ("Completion of operating method explanation" in step ST505), the main control unit 100 returns control to the process of step ST503, otherwise ("Except when the operation explanation is completed" in step ST505) the main control unit advances to a process of step ST506.

In the process of step ST506, the main control unit 100 sets up a display of an operation screen required in order to judge the user's intention of his or her manipulation as the final display state of a series of display state transition sequences (a transition path), and then starts the transition path extracting unit 101. Concretely, the display states F to L as shown in FIG. 4 are candidates for the final display state.

Thereby, the transition path extracting unit 101 extracts a transition path leading from the current display state to the final display state which implements the user's intention (step ST507). In this case, it is assumed that a procedure of extracting the transition path is the same as that which a search engine uses to determine a path leading from the current position to the destination through navigation.

The transition path extracting unit 101 then delivers the extracted transition path to the main control unit 100. When two or more transition paths are extracted and are delivered to the main control unit 100 (if "YES" in step ST508), the main control unit 100 has to select one of them. In this case, the main control unit 100 judges a transition path having a minimum transition number-of-times as the transition path which the navigation system uses to provide an explanation of the operating method for the user, and delivers the transition path to the main control unit 100 (step ST509).

Next, the main control unit 100 sets the display state of the head of the transition path as X, and also sets the display state to which the navigation system makes a transition the next time as Y (step ST510 of FIG. 6). The main control unit then removes the display state X from the head of the transition path (step ST511). Next, the main control unit 100 judges whether or not the "operation guidance display number-of-times XY" is larger than the threshold (step ST512).

When the operation guidance display number-of-times XY is larger than the threshold (if "YES" in step ST512), the main control unit 100 starts the drawing and display control unit 102, and the drawing and display control unit 102, which is under the control of the main control unit 100, combines the corresponding operation guidance and the reduced operation screen and then draws the composite screen in the display information storage unit 107 when making a transition from the display state X to the display state Y, and further reads and displays the composite screen in such a way as to automatically make a transition to the display state Y at a speed which the user can recognize (step ST513).

In contrast, when the operation guidance display number-of-times XY is smaller than the threshold (if "No" in step ST512), the drawing and display control unit 102 reads an operation explanation (i.e., an operation guidance) required when making a transition from the display state X to the display state Y from the operation guidance information storage unit 106 according to node information which the main control unit 100 reads from the transition graph storage unit 103, and generates display information which is a combination of the read operation guidance and an operation screen which is produced by carrying out a reducing process to furnish and display the display information to and on the display device 5. After that, the main control unit 100 waits for the user's selection operation (step ST514).

After the user completes a selection operation, the main control unit 100 updates the value of the counter showing the "operation guidance display number-of-times XY" by +1 (step ST515). The main control unit then judges whether or not the display state Y is the last one of the transition path which constructs the state transition sequences (step ST516). When judging that the display state Y is not the last one of the transition path (if "NO" in step ST516), the main control unit returns to the process of step ST510 and repeats the processes in step ST510 and subsequent steps, whereas when judging that the display state Y is the last one of the transition path (if "YES" in step ST516), the main control unit 100 reflects the setting corresponding to the user's selection operation in the system, and ends the processing (step ST517).

As previously explained with reference to the flow charts shown in FIGS. 5 and 6, operation explanations are made step by step in such a way that the navigation system makes a transition from the display state X to the display state Y automatically at a speed which the user can recognize, and the final operation screen required in order to judge the user's intention of his or her manipulation is displayed when the display state Y is the last one of the transition path. Because it is irksome for a user who is practiced in operating the navigation system to read the same operation explanations repeatedly, the navigation system can eliminate the display of the operation screens which are changed step by step when the navigation system makes a transition from the display state X to the display state Y to take a shortcut to the final operation screen and to display the final operation screen on the display device.

Concrete examples of the screen configuration of the navigation system in accordance with Embodiment 1 of the present invention and a screen change in the screen configuration are shown in FIGS. 7 to 10.

Figure 7:
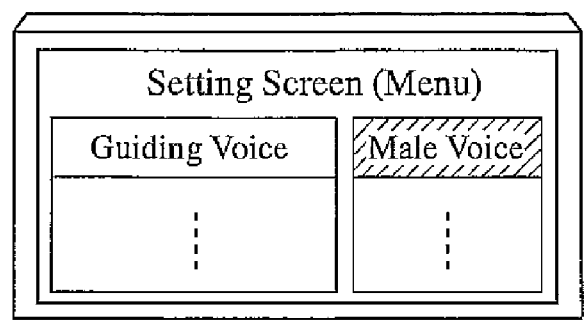
FIG. 7 shows an example of the screen configuration of the navigation system in accordance with Embodiment 1 of the present invention.
Figure 7:
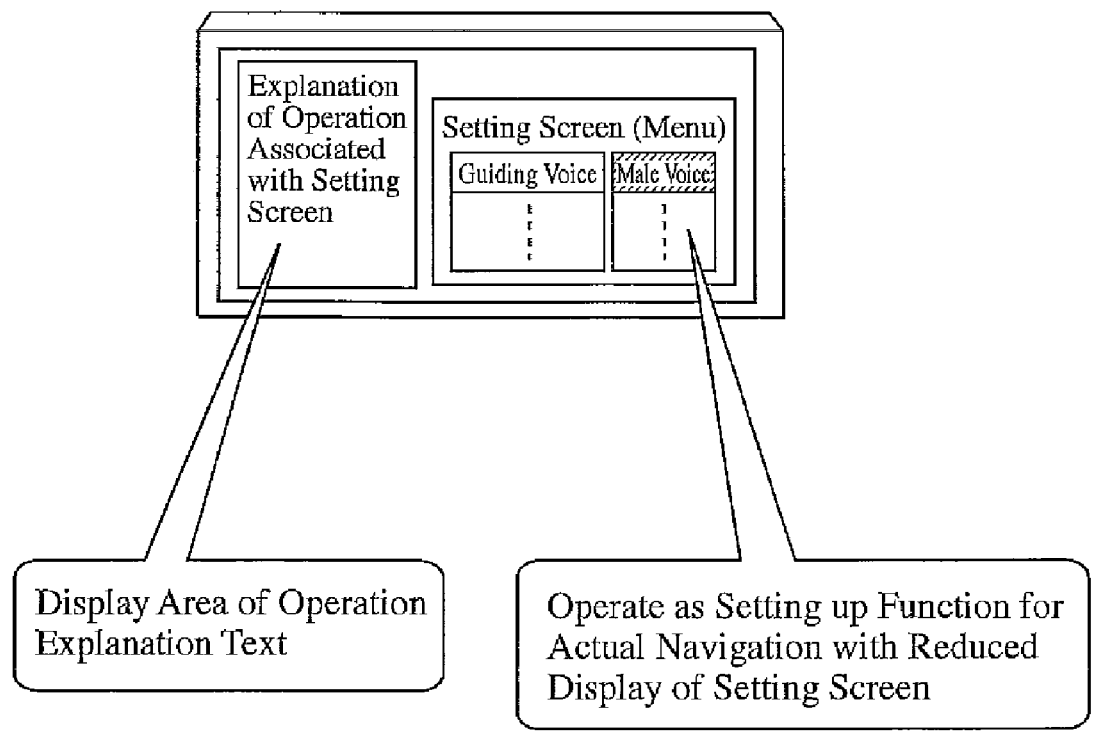

FIG. 7 shows an example of the screen configuration for navigation, and a setting screen in a normal mode is shown in FIG. 7(*a*) and an example of operation screens in an operation explanation mode is shown in FIG. 7(*b*).

As shown in FIG. 7(*b*), in accordance with Embodiment 1 of the present invention, a combination of two divided screen areas: an operation explanation text display area in which an operation guidance is displayed; and a reduced display area which is a setting screen is displayed on the single screen of the display device. Because VGA makes it possible to display a font and so on with a relatively-high degree of resolution also in the reduced display area, the user can perform a navigation operation, like in conventional cases.

Figure 8:
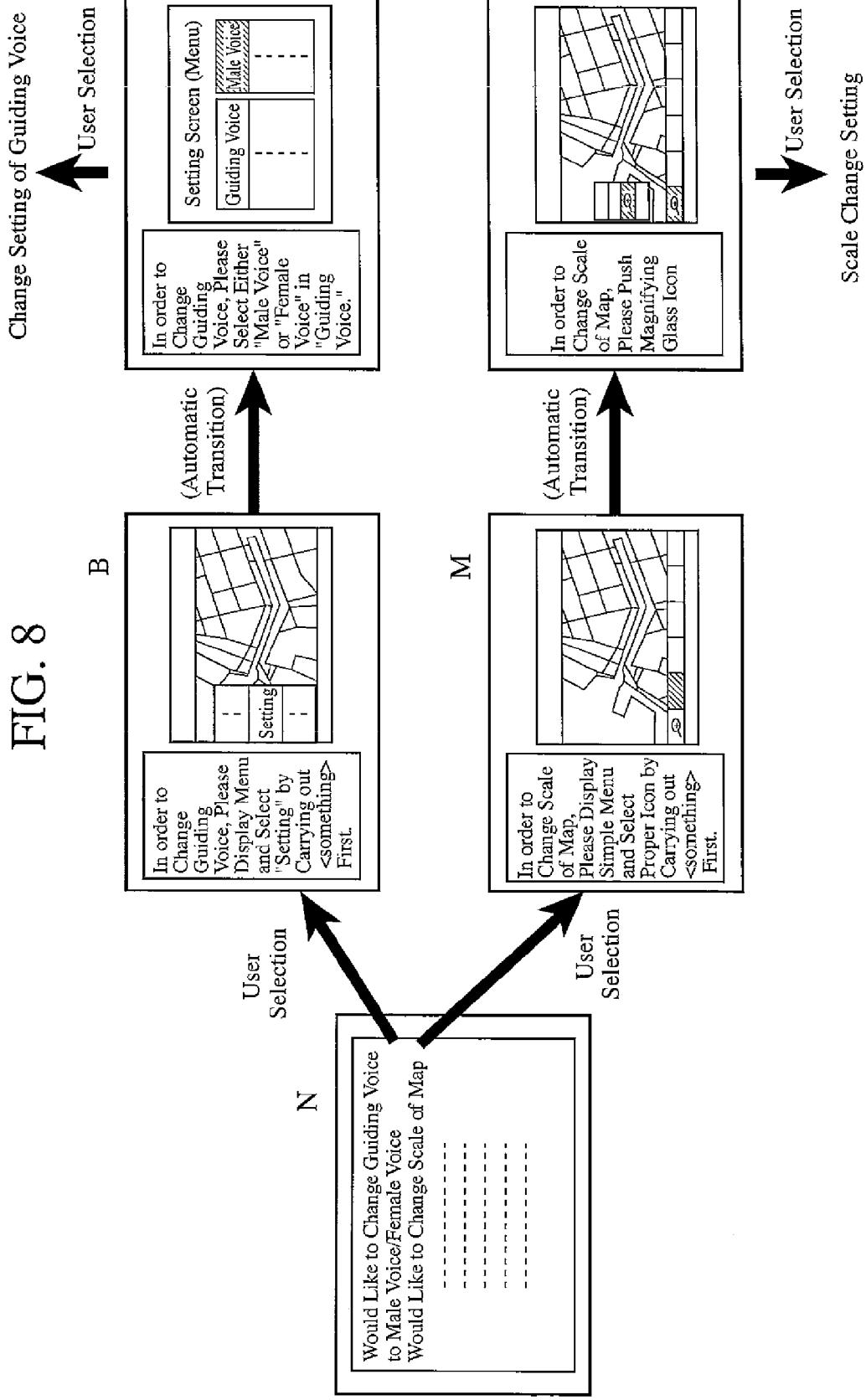
FIG. 8 shows an example of a concrete screen change of the navigation system in accordance with Embodiment 1 of the present invention.
Figure 9:
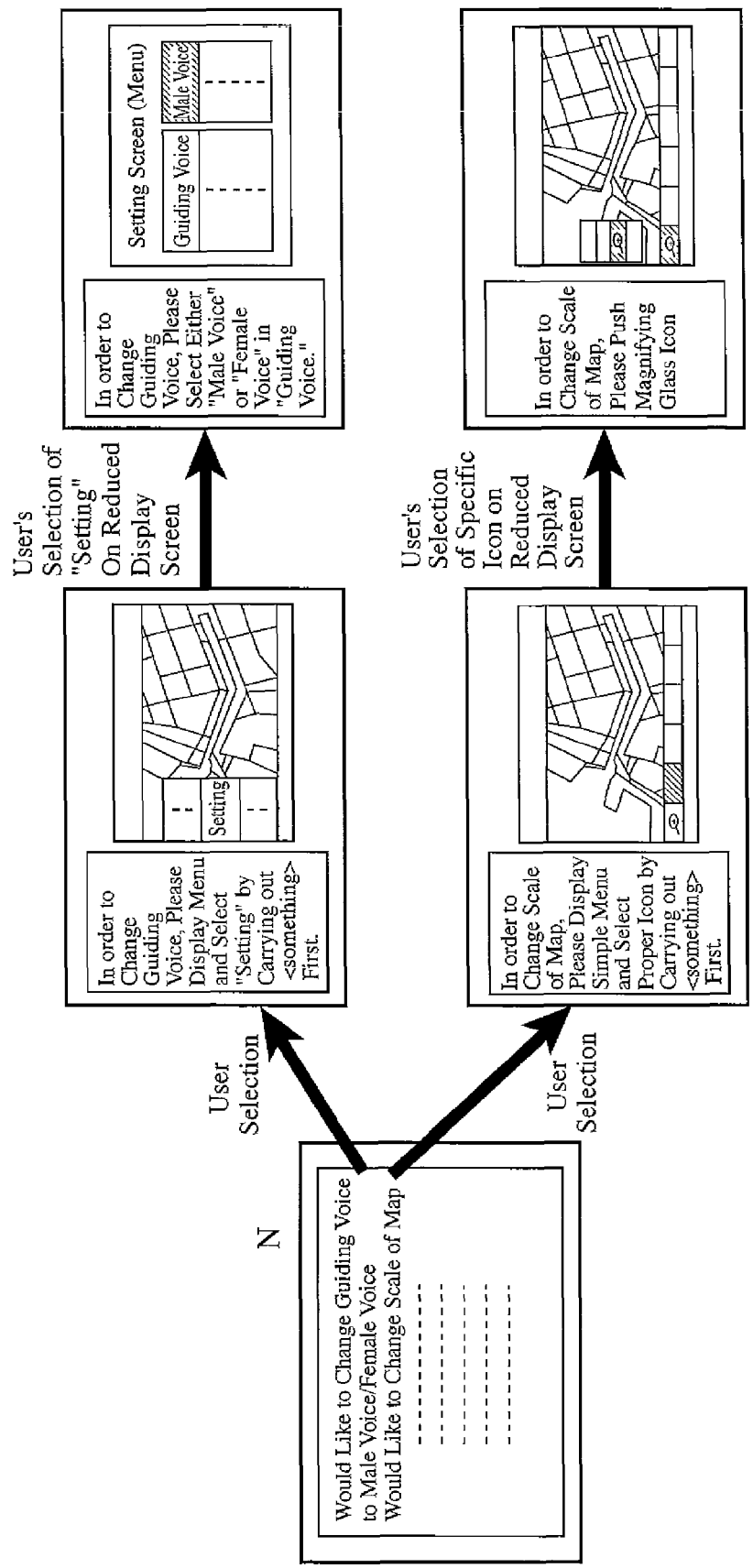
FIG. 9 shows an example of the concrete screen change of the navigation system in accordance with Embodiment 1 of the present invention.
Figure 10:
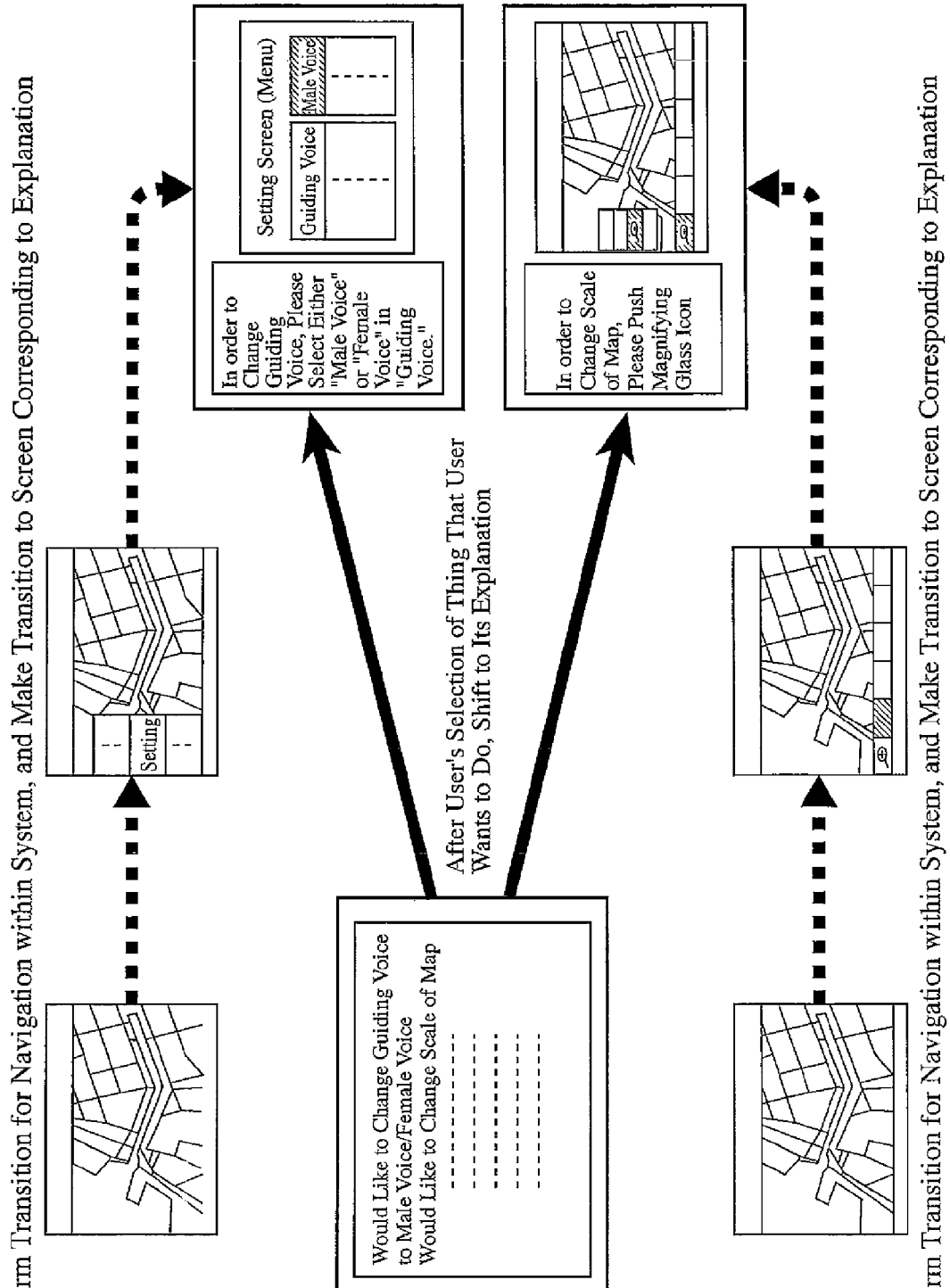
FIG. 10 shows an example of the concrete screen change of the navigation system in accordance with Embodiment 1 of the present invention.

Examples of the screen change for the navigation are shown in FIGS. 8 to 10. In these examples, in order to take the advantages of the electronized operation manual, operation guidances in how-to formats, such as "how to change the volume of the guiding voice", and "how to register the user's house", are provided, and, when the user selects "how to <something>", the navigation system jumps to its operation guidance and simultaneously makes a transition to the navigation screen corresponding to the operation guidance.

It is assumed that, in FIG. 8, the user's depression of an "operation explanation request key" produces a display of an operation explanation selection screen, such as "Change the guiding voice to male voice/female voice", or "Change the scale of the map display", in the screen N shown in FIG. 4.

When the user who has recognized this screen visually performs a selection input for desiring the former example (e.g., male voice→female voice), the navigation system makes a transition to the display state B as shown in FIG. 4, and then makes a transition to the final operation screen for changing the guiding voice automatically without waiting for the user's selection operation (in this case, the user's depression of a setting button assigned to the reduced display screen). The navigation system then performs a setting operation of waiting for the user's selection input based on the operation guidance (the user selects either "male voice" or "female voice" in "guiding voice" to change the guiding voice), and changing the guiding voice from male voice into female voice.

In contrast, when the user performs a selection input for desiring the latter example (i.e., selects a change in the scale of the map display), the navigation system makes a transition to the display state M as shown in FIG. 4, and then makes a transition to the final operation screen for changing the scale of the map automatically without waiting for the user's selection operation (in this case, the user's depression of a specific icon in the simple menu in the reduced display screen). The navigation system then changes the scale of the map to the desired scale which the user has selected after waiting for the user's selection input to the final operation screen.

The navigation system can display intermediate states which result in attainment of the user's intention: "I would like to do <something>", as needed, as shown in FIG. 9, and, every time when displaying each of the intermediate states, urges the user to perform a selection operation and captures the user's selection to carry out system settings.

In the examples shown in FIGS. 6 and 8, the navigation system is constructed in such a way as to display midway progresses (the display states B and M) in turn so that the user can recognize the state of the automatic operation (step ST513 of FIG. 6). As an alternative, as shown in FIG. 10, the navigation system is constructed in such a way as to omit the display of the midway progresses to take a shortcut and jump to the final operation screen. In this case, within the navigation system (the automatic operation management means 10) as described above, control is carried out in such a way as to combine and display the final operation screen which is reduced so as to make a transition directly to the final display state, and the operation guidance corresponding to the final operation screen.

As previously explained, in accordance with Embodiment 1 of the present invention, considering the fact that, in addition to improvements in the display device 5 and an OS for use in the navigation system, increase in the resolution of the display monitor (e.g., the use of a VGA-ready display monitor) enables sharp drawing of an image including a font, the navigation system produces a reduced display of an operation screen and also produces a display of a combination of the reduced operation screen and the operation guidance corresponding to the operation screen, and automatically performs operations for operation screens leading to the final operation screen among the operation sequences for implementing the user's intention. Therefore, the navigation system enables the user to perform a desired operation in a short time without performing operations in all steps.

Especially, in a case in which the hierarchy of the operation sequences (the menu hierarchy) is deep, the navigation system makes the automatic operation management means 10 automatically perform operations which do not need the user's judgment among the operations for implementing the user's intention (for example, the user's intention to change the guiding voice from male voice to female voice). Therefore, the navigation system can reduce the number of times that the user must perform an operation until implementing the user's intention, and can therefore reduce the load required for the user to implement the user's intention.

In addition, the navigation system in accordance with Embodiment 1 of the present invention initializes the threshold for the operation guidance display number-of-times, the automatic operation management means 10 counts the number of times that it has followed the transition path extending from the display state X to the display state Y so as to provide an explanation of an operating method step by step a predetermined number of times, and, after that, can make settings to enable automatic operations, thereby making it possible to provide the control with flexibility.

For example, when the threshold is set to "1", the navigation system produces an operation guidance display once step by step, though the navigation system automatically carries out the operation for the second and subsequent times, thereby reducing the load on a user who is practiced in operating the navigation system. Therefore, in an early stage in which the user is not used to operating the navigation system, the user can perform operational inputs carefully with reference to operation guidances, and, in a stage in which the user gets used to operating the navigation system, the user can omit some operational inputs and perform only a first operational input with reference to the operation guidance shown. Therefore, the user who has got used to operating the navigation system gradually does not have to manually perform any operation which the navigation system can perform automatically, and therefore the user-friendliness of the navigation system can be improved.

Concretely, the automatic operation management means 10 shown in FIGS. 1 and 2 is constructed of a CPU, a memory, and peripheral LSIs, the functions of the main control unit 100 and the transition path extracting unit 101 which construct the automatic operation management means 10 are implemented by the CPU's sequential execution of a program stored in the memory, and the functions of the drawing and display control unit 102 are implemented by a peripheral device under the control of the CPU. Furthermore, the transition graph storage unit 103, the operation guidance display number-of-times storage unit 104, the operation guidance display number-of-times threshold storage unit 105, the operation guidance information storage unit 106, and the display information storage unit 107 are assigned to and stored in the memory.

INDUSTRIAL APPLICABILITY

As mentioned above, because the navigation system in accordance with the present invention, and the operation guidance display method for use in the navigation system reduces operation screens, avoids display resource conflicts by producing a display of a composite screen of an operation screen and an operation guidance and provides an improvement in the visibility of the display screen, and provides an improvement in the user-friendliness of the navigation system by omitting manual operations required for the user to reach a final operation screen, thereby making it possible to reduce the load on the user, the navigation system and the operation guidance display method are suitable for use in vehicle-mounted equipment, such as a navigation system having only a small- or middle-sized display area.

The invention claimed is:

1. A navigation system comprising:
  an input device for making an operation guidance display request for display of an operation guidance according to a user's manipulation;
  a display device for combining an operation guidance and a reduced operation screen corresponding to said operation guidance to display them;
  a transition graph storage unit in which a series of operation screens leading to display of the final operation screen required to implement the user's intention of the manipulation done by the user are stored in a form of graph structure;
  a transition path extracting unit for referring to said transition graph storage unit, and for extracting transition paths respectively leading to nodes which construct said graph; and
  a control device equipped with an automatic operation management unit, wherein every time when an initial value is set up for each of said transition paths, and an operation screen of said transition path is displayed, said automatic operation management unit counts a number of times that a corresponding operation guidance is displayed and compares said counted number of times that the operation guidance is displayed with a certain number of operation guidance display times which is predetermined as a threshold so as to judge whether said automatic operation management unit waits for the user's selection operation or makes an automatic transition to the final operation screen.

2. The navigation system according to claim 1, wherein said automatic operation management unit includes:
  a main control unit for carrying out development and control of operation guidances being held while being respectively associated with said nodes in turn according to a transition among said operation screens; and
  a drawing and display control unit under control of said main control unit, for generating display information which is a combination of each of said operation guidances and a reduced operation screen corresponding to each of said operation guidances and sequentially updating the display information at a speed velocity which the user can recognize to display the display information on said display device.

3. An operation guidance display method for use in a navigation system which combines a reduced operation screen and a screen of an operation guidance about the operation screen to display them on a display device, and which comprises at least an input device, a storage device, a control device, and said display device, said operation guidance display method comprising the steps of:
  said control device being triggered by acquisition of a request for display of an operation guidance which is generated by a user's manipulation of said input device to refer to said storage device in which a series of operation screens leading to display of a final operation screen required to judge the user's intention of the manipulation done by the user are stored in a form of graph structure, and to extract transition paths respectively leading to nodes which construct said graph; and
  every time when an initial value is set up for each of said transition paths, and an operation screen of said transition path is displayed, said control device counting a number of times that a corresponding operation guidance is displayed and comparing said counted number of times that the operation guidance is displayed with a certain number of operation guidance display times which is predetermined as a threshold so as to judge whether said control device waits for the user's selection operation or makes an automatic transition to the final operation screen.

* * * * *